United States Patent [19]

Ely

[11] 4,133,383

[45] Jan. 9, 1979

[54] TERMINATING THE FLOW OF FLUIDS FROM UNCONTROLLED WELLS

[75] Inventor: John W. Ely, Duncan, Okla.

[73] Assignee: Halliburton Company, Duncan, Okla.

[21] Appl. No.: 833,856

[22] Filed: Sep. 16, 1977

[51] Int. Cl.² .................... E21B 35/00; E21B 33/138
[52] U.S. Cl. .................................. 166/270; 166/285; 166/295
[58] Field of Search ............. 166/270, 285, 294, 295, 166/300; 61/36 C

[56] References Cited

U.S. PATENT DOCUMENTS

| 2,274,297 | 2/1942 | Irons et al. ..................... 166/295 X |
| 3,003,557 | 10/1961 | Huitt et al. ........................ 166/271 |
| 3,199,588 | 8/1965 | Holbert ............................. 166/295 |
| 3,763,934 | 10/1973 | Coultler, Jr. et al. ............. 166/294 |
| 3,795,276 | 3/1974 | Eilers et al. ..................... 166/294 X |
| 3,881,552 | 5/1975 | Hessert ............................. 166/294 |
| 3,958,638 | 5/1976 | Johnston .......................... 166/294 |
| 4,069,869 | 1/1978 | Sandiford ....................... 166/294 X |

Primary Examiner—Stephen J. Novosad
Assistant Examiner—George A. Suchfield
Attorney, Agent, or Firm—Thomas R. Weaver; John H. Tregoning; C. Clark Dougherty, Jr.

[57] ABSTRACT

A method of terminating the flow of formation fluids from an uncontrolled well comprising introducing a low viscosity fluid into the formation having the property of subsequently becoming highly viscous whereby the portion of the formation adjacent the uncontrolled well is surrounded by highly viscous fluid which blocks the flow of formation fluids to the uncontrolled well.

17 Claims, 9 Drawing Figures

TERMINATING THE FLOW OF FLUIDS FROM UNCONTROLLED WELLS

Formation fluid blowouts often occur during drilling of well bores allowing the uncontrolled flow of water, oil and/or gas to the surface. In many instances, such uncontrolled flow causes damage to surface equipment whereby the flow cannot be shut off at the surface, and as a result, one or more separate wells must be drilled into the formation so that the uncontrolled well can be killed by pumping foreign material into the formation by way of the separate wells.

Heretofore, a variety of fluids have been utilized for killing uncontrolled wells, i.e., terminating the flow of formation fluids therefrom, including oil, water, drilling mud, and cement, all of which have distinct disadvantages. For example, oil and water are often incapable of terminating the uncontrolled flow due to their relatively low viscosities and densities, and when used, large quantities are usually required making their use very expensive. Because of the high viscosities of drilling mud, cement and other weighted fluids, it is often extremely difficult or impossible to pump such fluids into the formation, and in addition, such fluids require special mixing, storing and pumping equipment, making their use extremely expensive.

By the present invention, a method of terminating the flow of formation fluids from uncontrolled wells is provided which obviates the problems mentioned above and which can be carried out in an efficient and economical manner. More specifically, the method of the present invention comprises introducing a low viscosity fluid into the formation by way of at least one separate well penetrating the formation, said fluid having the property of becoming highly viscous after it has reached and flowed into the formation. The introduction of the fluid is continued until the fluid surrounds the portion of the formation adjacent the uncontrolled well and becomes highly viscous therein thereby terminating the flow of formation fluids to the uncontrolled well.

In the accompanying drawings forming a part of this disclosure:

Figure 1:
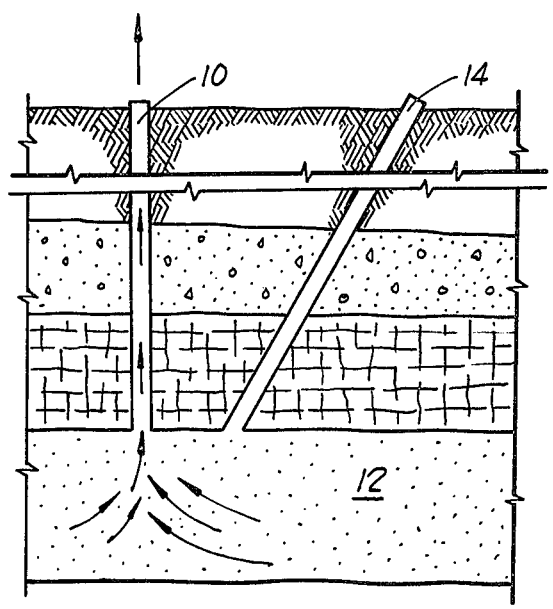
FIG. 1 is a side sectional schematic view of a subterranean formation penetrated by an uncontrolled well and a separate directionally drilled well.
Figure 2:
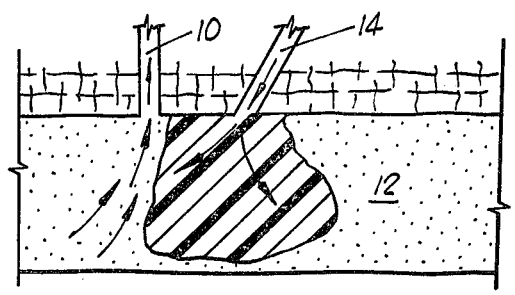
FIG. 2 is a schematic illustration similar to FIG. 1 showing the formation after a quantity of fluid has been introduced thereinto in accordance with the present invention by way of the directionally drilled well.

A preferred low viscosity fluid for use in accordance with the present invention which is readily pumpable and which readily flows through a subterranean formation, but which has the property of becoming highly viscous after remaining in the formation for a known period of time is an aqueous fluid containing a temperature sensitive viscosity increasing additive, hereinafter referred to as a retarded gelling agent. When such an aqueous fluid is introduced into and caused to flow through a subterranean formation, it is heated by the formation causing the retarded gelling agent to hydrate and the viscosity of the aqueous fluid to increase.

A particularly suitable and preferred retarded gelling agent is described in U.S. Pat. No. 3,768,566, dated Oct. 30, 1973, which is assigned to the assignee of this present application, and which is incorporated herewith and made a part hereof. As described in detail in the aforesaid patent, the retarded gelling agent is a hydratable polysaccharide crosslinked with a compound such that the polysaccharide's hydration rate is greatly retarded at temperatures below about 100° F. At temperatures above about 140° F., the bonds between the crosslinked compound and the polysaccharide readily break thereby enabling the aqueous fluid to hydrate the polysaccharide which in turn increases the viscosity of the aqueous fluid. The rate of hydration of the polysaccharide is controlled by varying the quantity of crosslinking compound combined with the polysaccharide and the pH of the aqueous fluid.

More specifically, the retarded gelling agent which is preferred for use in accordance with the present invention is a hydratable polysaccharide crosslinked with a compound selected from the group consisting of dialdehydes having the general formula

OCH(CH$_2$)$_n$CHO, wherein n is an integer within the range of 0 to about 3; 2-hydroxyadipaldehyde; dimethylol urea; water soluble urea formaldehyde resins; water soluble melamine formaldehyde resins; and mixtures of the foregoing compounds.

Preferred crosslinking compounds for forming the retarded gelling agent are dialdehydes having the general formula

OHC(CH$_2$)$_n$CHO, wherein n is an integer within the range of 1 to about 3.

Examples of such dialdehydes are glyoxal, malonic dialdehyde, succinic dialdehyde and glutardialdehyde. Of these glyoxal is preferred.

Polysaccharides which are suitable for forming the retarded gelling agent are hydratable polysaccharides having a molecular weight of at least about 100,000 and preferably within the range of about 200,000 to about 3,000,000. Examples of such polysaccharides are hydratable galactomannan gums and derivatives thereof, hydratable glucomannan gums and derivatives thereof and hydratable cellulose derivatives. Of these guar gum, locust bean gum, karaya gum, hydroxypropyl guar gum and carboxymethylcellulose are preferred. The most preferred polysaccharide for use in accordance with the present invention is hydroxyethylcellulose having an ethylene oxide substitution within the range of from about 1.3 to about 3 moles of ethylene oxide per anhydroglucose unit.

When the hydratable polysaccharides are crosslinked with the above-mentioned crosslinking compounds at concentrations within the range of about 0.05 to about 100 parts by weight crosslinking compound per 100 parts by weight polysaccharide, the resulting retarded gelling agent is substantially insoluble in an aqueous fluid having a pH of less than about 7 at a temperature of less than about 100° F. At crosslinking compound concentrations of less than about 0.05 parts by weight per 100 parts by weight polysaccharide, the crosslinking which results is insufficient to prevent rapid hydration of the polysaccharide. At concentrations above about 100 parts by weight crosslinking compound per 100 parts polysaccharide, the rate of hydration is generally too slow. As will be described in greater detail hereinbelow, the particular concentration of crosslinking compound used and the pH of the aqueous fluid determine the rate of hydration of the polysaccharide, and are selected in accordance with the method of the present invention to provide desired results when the aqueous fluid containing the crosslinked polysaccharide is introduced into a subterranean formation.

Figure 9:
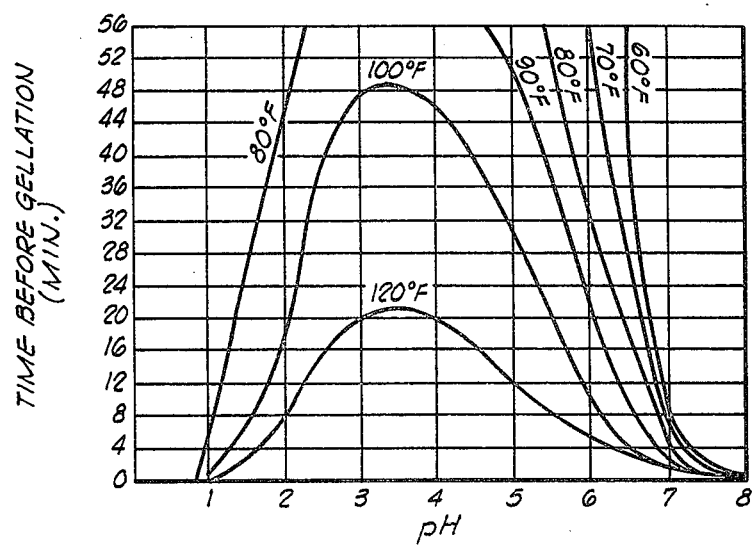
FIG. 9 is a graphical illustration of pH versus gelation time at various temperatures for an aqueous fluid containing a retarded gelling agent comprised of hydroxyethylcellulose crosslinked with glyoxal.

The pH of the aqueous fluid is adjusted to provide a rate of hydration or gelation time of desired duration whereby the aqueous fluid remains at a low viscosity for a period of time to allow penetration into the formation, etc. Preferably a water soluble acid is added to the fluid to adjust the pH thereof to the desired level. Acids such as fumeric acid and sodium dihydrogen phosphate are preferred because of their buffering qualities. Referring to FIG. 9, the pH versus gelation time (10 centipoise rise in viscosity) of an aqueous fluid containing a retarded gelling agent comprised of hydroxyethylcellulose crosslinked with glyoxal is graphically illustrated. As shown, maximum retardation occurs at a pH of approximately 3.5 over a temperature range of from about 60° F. to about 120° F. Thus, a decrease in gelation time can be obtained by increasing or decreasing the pH of the fluid from 3.5.

The pH of the aqueous fluid is also a factor if the aqueous fluid is heated to temperatures above about 300° F. At such temperatures, the acid in combination with the high temperature rapidly degrade the hydrated polysaccharides and reduce the viscosity of the aqueous fluid. In order to overcome this problem, an encapsulated base can be included in the aqueous fluid which releases at about 300° F. thereby offsetting the degrading effect of the acid. A preferred encapsulated base is sodium bicarbonate coated with a paraffin having a melting point within the range of about 150° F. to about 300° F.

The hydrated polysaccharides are most stable at high temperatures when a small amount of a stabilizing agent such as a water soluble alcohol is present in the aqueous fluid. Suitable alcohols are represented by the general formula

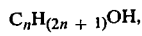

$$C_nH_{(2n + 1)}OH,$$

wherein n is an integer within the range of 1 to about 5, and preferably within the range of 1 to about 4.

The most preferred alcohols are those falling within the above formula wherein n is an integer within the range of 1 to about 3. Examples of such alcohols are methanol, ethanol, n-propanol and isopropanol.

The most preferred fluid having the properties mentioned above for use in accordance with the method of the present invention is an aqueous fluid having a pH of less than 7 and having a retarded gelling agent mixed therewith comprised of hydroxyethylcellulose having an ethylene oxide substitution within the range of about 1.3 to about 3.0 moles of ethylene oxide per anhydroglucose unit crosslinked with glyoxal at a concentration within the range of about 0.05 to about 100 parts by weight glyoxal per 100 parts by weight of said hydroxyethylcellulose, the retarded gelling agent being present in the aqueous fluid in an amount in the range of from about 10 to about 500 pounds per 1000 gallons of the aqueous fluid.

For use in formations at temperatures above about 200° F., the aqueous fluid preferably also contains a water soluble alcohol selected from the group consisting of methanol, ethanol, n-propanol and isopropanol present in an amount in the range of about 1 to about 10 and preferably about 2 to about 7 parts by volume alcohol per 100 parts by volume of aqueous fluid.

For use in formations at temperatures above about 300° F., the aqueous fluid can additionally contain a base, e.g., sodium bicarbonate, coated with a paraffin having a melting point within the range of about 150° F. to about 300° F., present in an amount in the range of from about 5 to about 50 pounds of base per 1000 gallons of aqueous fluid.

Depending upon the permeability, porosity, and other characteristics of the formation into which the aqueous fluid is introduced, it is sometimes advantageous to include in the aqueous fluid a quantity of unretarded gelling agent which increases the viscosity of the fluid without requiring the equipment and expense associated with crosslinking the gelling agent. Unretarded gelling agents which are useful for this purpose are the hydratable polysaccharides described above and hydratable polyacrylamides having a molecular weight of at least about 30,000. Molecular weights below about 30,000 for polyacrylamides and 100,000 for polysaccharides will generally increase the viscosity of the aqueous fluid, but the higher molecular weights are more efficient on a per pound basis and are preferred. The most preferred unretarded gelling agent, if used, is hydroxyethylcellulose having an ethylene oxide substitution within the range of about 1.3 to about 3 moles of ethylene oxide per anhydroglucose unit, added to the aqueous fluid in an amount in the range of from about 10 to about 300 pounds of gelling agent per 1000 gallons of aqueous fluid.

As will be understood by those skilled in the art, in addition to the specific compounds mentioned above, the aqueous fluid can also contain fluid loss control additives, surfactants, clay control chemicals, and other formation treating chemicals which are compatible with the aqueous fluid and compounds contained therein.

Referring now to FIGS. 1 through 6 of the drawings, and particularly to FIG. 1, an uncontrolled well 10 is illustrated penetrating a formation 12 containing water, oil and/or gas under pressure. As will be understood, because the uncontrolled well 10 is open to the atmosphere at the surface, pressurized fluids contained within the formation 12 flow through the formation 12 into the well 10 and are driven upwardly to the surface. In order to terminate the flow of formation fluids from the uncontrolled well 10, a separate well 14 is directionally drilled into the formation 12 so that the point at which the well 14 penetrates the formation 12 is as close to the well 10 as possible, but well 14 does not intersect well 10.

In carrying out the method of the present invention, once the directionally drilled well 14 has been completed, an aqueous fluid containing a retarded gelling agent of the type described above is prepared. The characteristics of the aqueous fluid, i.e., the quantity of retarded gelling agent utilized in the fluid, the concentration of crosslinking compound reacted with the hydratable polysaccharide to form the retarded gelling agent, the pH of the aqueous fluid, the quantity and kinds of other compounds added to the aqueous fluid, etc., depend upon the distance between the uncontrolled well and the directionally drilled well and the particular characteristics of the formation 12, such as the temperature of the formation, the porosity thereof, the permeability thereof, etc. Generally, however, the aqueous fluid containing the retarded gelling agent is prepared so that its initial viscosity is such that it can be readily handled and pumped into the formation 12 and caused to uniformly penetrate the formation without fracturing the formation. The hydration time of the retarded gelling agent, i.e., the time period between the preparation of the aqueous fluid containing the agent and the hydration of the agent to the extent that a high viscosity fluid is produced, is controlled so that the fluid can flow through the formation towards the portion thereof adjacent the uncontrolled well before becoming highly viscous.

When the aqueous fluid is injected into the formation by means of a single directionally drilled well, as shown in FIGS. 1-6, an initial quantity of the aqueous fluid is injected into the formation having a hydration time such that the fluid can flow the distance between the directionally drilled well 14 and the uncontrolled well 10 before substantial viscosity increase occurs. Because the formation fluids contained in the formation 12 are moving towards the uncontrolled well 10, the aqueous fluid injected into the formation 12 by way of the directionally drilled well 14 has a natural tendency to flow towards the uncontrolled well 10.

Figure 3:
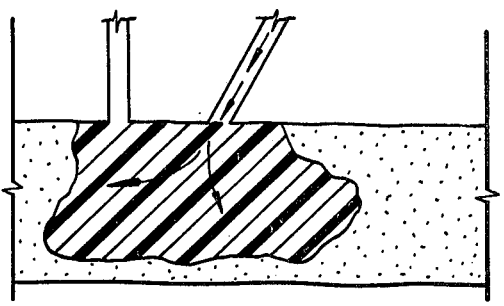
FIG. 3 is a schematic illustration similar to FIG. 1 showing the formation after additional fluid has been introduced thereinto and the flow of formation fluids to the uncontrolled well terminated.
Figure 4:
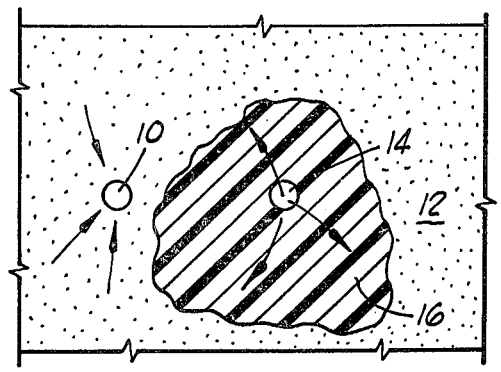
FIG. 4 is a top sectional schematic view of the formation at the stage illustrated in FIG. 2.
Figure 5:
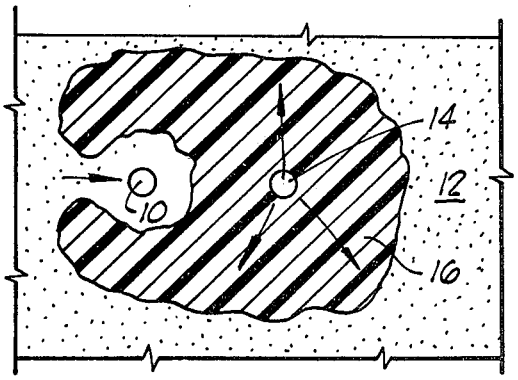
FIG. 5 is a top sectional schematic view of the formation just prior to when the fluid introduced to the formation by way of the directionally drilled well surrounds the portion of the formation adjacent to the uncontrolled well.
Figure 6:
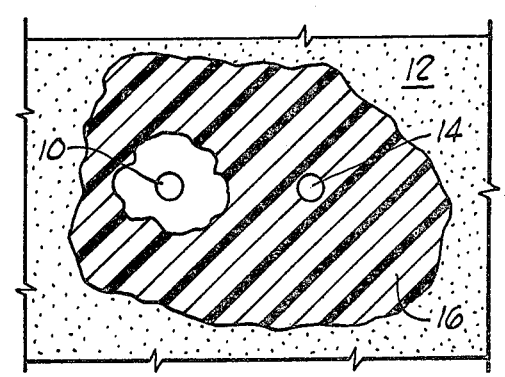
FIG. 6 is a top sectional schematic view of the formation at the stage illustrated in FIG. 3.

After the initial quantity of aqueous fluid is injected into the formation 12 to form a mass of highly viscous fluid 16 therein, additional aqueous fluid having a longer hydration time is injected into the formation by way of the well 14 so that the fluid tends to flow past the uncontrolled well 10 as shown in FIG. 5 thereby enlarging the highly viscous mass 16 in the formation 12. As additional aqueous fluid having a longer hydration time is introduced into the formation 12 by way of the well 14, the aqueous fluid encircles the portion of the formation 12 adjacent the uncontrolled well 10 as shown in FIGS. 3 and 6 and becomes highly viscous therein so that the flow of formation fluids to the uncontrolled well 10 is blocked by the mass 16.

After the flow of formation fluids through the uncontrolled well 10 has been terminated, conventional flow control apparatus can be installed on the well 10 at the surface. Once this has been accomplished, the body of highly viscous fluid 16 can be readily removed from the formation 12 using conventional acidizing procedures, or time delayed chemicals can be included in the aqueous fluid for breaking the highly viscous fluid back to a low viscosity fluid whereby the well 10 can be produced in a normal manner, all without damage to the formation 12.

Figure 7:
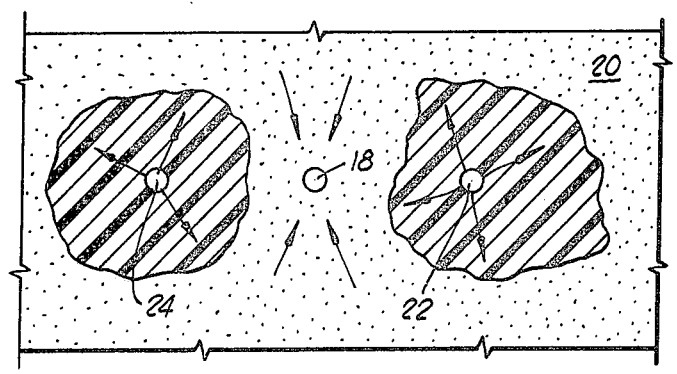
FIG. 7 is a top sectional view of a formation penetrated by an uncontrolled well and two separate directionally drilled wells after quantities of fluid have been introduced into the formation in accordance with the present invention by way of the directionally drilled wells.
Figure 8:
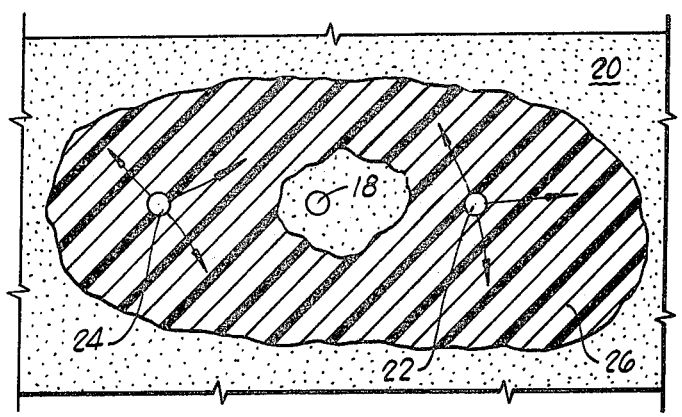
FIG. 8 is a schematic illustration similar to FIG. 7 showing the formation after additional fluid has been introduced thereinto and the flow of formation fluids to the uncontrolled well terminated.

Referring now to FIGS. 7 and 8, an uncontrolled well 18 is illustrated penetrating a formation 20. Instead of a single directionally drilled well, a pair of wells 22 and 24 are directionally drilled into the formation 20, one on either side of the uncontrolled well 18. An aqueous fluid including a retarded gelling agent is simultaneously pumped into the formation 20 through both of the wells 22 and 24 as illustrated in FIGS. 7 and 8 until the fluid surrounds the portion of the formation 20 adjacent the uncontrolled well 18 as illustrated in FIG. 8. When the retarded gelling agent hydrates to increase the viscosity of the aqueous fluid, a body 26 of highly viscous fluid is formed in the formation 20 which blocks formation fluids from flowing through the uncontrolled well 18. As stated above, the aqueous fluid injected into the formation 20 by way of the directionally drilled wells 22 and 24 has a natural tendency to flow towards the uncontrolled well 18, and because the aqueous fluid is simultaneously injected on either side of the uncontrolled well 18, an aqueous fluid having a single hydration time can normally be utilized.

As will be readily apparent to those skilled in the art, many widely differing embodiments of this invention can be made. For example, if it is desired to permanently plug an uncontrolled well, an aqueous or other fluid containing a hardenable compound or resin, the viscosity of which is increased or which is hardened by heating or by contact with a hardening agent can be utilized in accordance with the method of the present invention. Organic resins which can be used are epoxy resins, phenolaldehyde resins, furfuryl alcohol resins, urea-aldehyde resins and others. Diluents for controlling the initial viscosities of the resins such as monomeric liquids capable of copolymerizing with the resins can also be utilized, e.g., furfuryl alcohol, phenols, furfural and formaldehydes. Examples of internal and external hardening agents which can be utilized are amines, hexachloroacetone, benzotrichloride, acyl halide compounds, halogenated organic acids, inorganic acids, acid producing compounds and others. Thus, numerous changes can be made by those skilled in the art without departing from the spirit of this invention as defined by the appended claims.

What is claimed is:

1. A method of terminating the flow of formation fluids from an uncontrolled well penetrating said formation, said method comprising the steps of:

introducing a low viscosity fluid into said formation by way of at least one separate well penetrating said formation, wherein said low viscosity fluid is introduced into said formation under conditions insufficient to produce a fracture therein and further wherein said low viscosity fluid becomes highly viscous after having been introduced into said formation; and continuing said introduction of said low viscosity fluid into said formation by way of said separate well until said low viscosity fluid surrounds the portion of said formation adjacent said uncontrolled well and becomes highly viscous in said formation thereby terminating the flow of formation fluids to said uncontrolled well.

2. The method of claim 1 wherein said low viscosity fluid comprises a mixture of an aqueous fluid and a retarded gelling agent which hydrates at a controlled rate upon being heated by said formation thereby causing said fluid to become highly viscous therein.

3. The method of claim 2 wherein said aqueous fluid has a pH of less than 7 and said retarded gelling agent is comprised of a hydratable polysaccharide crosslinked with a compound selected from the group consisting of dialdehydes having the general formula:

$$OHC(CH_2)_nCHO,$$

wherein n is an integer within the range of 0 to about 3, 2-hydroxyadipaldehyde, dimethylol urea, water soluble urea formaldehyde resins, water soluble melamine formaldehyde resins and mixtures thereof.

4. The method of claim 3 wherein said polysaccharide is crosslinked with said compound at a concentration within the range of from about 0.05 to about 100 parts by weight of said compound per 100 parts by weight of said polysaccharide.

5. The method of claim 4 wherein said retarded gelling agent is present in said aqueous fluid in an amount in the range of from about 10 to about 500 pounds per 1000 gallons of said aqueous fluid.

6. The method of claim 3 wherein said aqueous fluid is further characterized to include an alcohol selected from the group consisting of alcohols having the general formula:

$$C_nH_{(2n+1)}OH,$$

wherein n is an integer within the range of 1 to about 5, and mixtures thereof.

7. The method of claim 6 wherein said aqueous fluid is further characterized to include a base encapsulated with a material having a melting point within the range of about 150° F. to about 300° F.

8. The method of claim 3 wherein said hydratable polysaccharide is selected from the group consisting of galactomannan gums, glucomannan gums, cellulose derivatives and mixtures thereof, said polysaccharide having a molecular weight of at least about 100,000.

9. The method of claim 3 wherein said hydratable polysaccharide is hydroxyethylcellulose having an ethylene oxide substitution within the range of about 1.3 to about 3 moles of ethylene oxide per anhydroglucose unit.

10. The method of claim 9 wherein said crosslinking compound is a dialdehyde selected from the group consisting of dialdehydes having the general formula:

$$OHC(CH_2)_nCHO,$$

wherein n is an integer within the range of 0 to about 3.

11. The method of claim 9 wherein said crosslinking compound is glyoxal.

12. The method of claim 11 wherein said aqueous fluid is further characterized to include an unretarded gelling agent selected from the group consisting of a hydratable polysaccharide having a molecular weight of at least about 100,000, a hydratable polyacrylamide having a molecular weight of at least about 30,000, and mixtures thereof.

13. The method of claim 12 wherein said unretarded gelling agent is present in said aqueous fluid in an amount in the range of from about 10 to about 300 pounds per 1000 gallons of said aqueous fluid.

14. The method of claim 13 wherein said aqueous fluid further includes an alcohol selected from the group consisting of methanol, ethanol, n-propanol and isopropanol present in an amount in the range of from about 2 to about 7 parts by volume per 100 parts by volume of said aqueous fluid, and a base encapsulated with a material having a melting point within the range of about 150° F. to about 300° F. present in said aqueous fluid in an amount in the range of from about 5 to about 50 pounds per 1000 gallons of said aqueous fluid.

15. The method of claim 1 wherein said low viscosity fluid contains a hardenable compound selected from the group consisting of epoxy resins, phenol-aldehyde resins, furfuryl alcohol resins, urea-aldehyde resins and mixtures thereof and a hardening agent selected from the group consisting of hexachloroacetone, benzotrichloride, acyl halide compounds, halogenated organic acides, inorganic acids and acid producing compounds.

16. A method of terminating the flow of formation fluids from an uncontrolled well penetrating said formation, said method comprising the steps of:
    penetrating said formation from which said fluids are flowing to said uncontrolled well with one or more separate wells;
    introducing into said formation by way of said separate wells under conditions insufficient to produce a fracture therein a low viscosity aqueous fluid having a pH of less than 7 and including a retarded gelling agent which hydrates at a controlled rate upon being heated by said formation comprised of hydroxyethylcellulose having an ethylene oxide substitution within the range of about 1.3 to about 3.0 moles of ethylene oxide per anhydroglucose unit crosslinked with glyoxal at a concentration within the range of about 0.05 to about 100 parts by weight glyoxal per 100 parts by weight of said hydroxyethylcellulose, said retarded gelling agent being present in said aqueous fluid in an amount in the range of from about 10 to about 500 pounds per 1000 gallons of said aqueous fluid; and
    said introduction of said aqueous fluid into said formation being continued until said fluid has flowed into said formation to the extent that the portion of said formation adjacent said uncontrolled well is surrounded by said fluid and said retarded gelling agent in said fluid is hydrated thereby increasing the viscosity of said fluid and terminating the flow of formation fluids to said uncontrolled well.

17. The method of claim 15 wherein said aqueous fluid further includes an unretarded gelling agent comprised of hydroxyethylcellulose having an ethylene oxide substitution within the range of about 1.3 to about 3 moles of ethylene oxide per anhydroglucose unit present in said aqueous fluid in an amount in the range of from about 10 to about 300 pounds per 1000 gallons of said aqueous fluid.

* * * * *

UNITED STATES PATENT AND TRADEMARK OFFICE
CERTIFICATE OF CORRECTION

PATENT NO. : U.S. 4,133,383

DATED : January 9, 1979

INVENTOR(S) : John W. Ely

It is certified that error appears in the above–identified patent and that said Letters Patent are hereby corrected as shown below:

In Claim 17, at line 55 of Column 8, delete the numeral "15" and insert therefor --16--.

Signed and Sealed this

First Day of May 1979

[SEAL]

Attest:

RUTH C. MASON
Attesting Officer

DONALD W. BANNER
Commissioner of Patents and Trademarks